(12) United States Patent
Chavez et al.

(10) Patent No.: US 11,768,506 B1
(45) Date of Patent: Sep. 26, 2023

(54) CONTROLLING VEHICLE SYSTEMS BASED ON VERIFIED SIGNALS

(71) Applicant: United Services Automobile Association (USAA), San Antonio, TX (US)

(72) Inventors: Carlos J P Chavez, San Antonio, TX (US); Sacha Melquiades De'Angeli, San Antonio, TX (US); David M. Jones, Jr., San Antonio, TX (US); Gregory Brian Meyer, San Antonio, TX (US); Christopher Russell, San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 121 days.

(21) Appl. No.: 17/215,977

(22) Filed: Mar. 29, 2021

Related U.S. Application Data (60) Provisional application No. 63/002,720, filed on Mar. 31, 2020.

(51) Int. Cl.
*G05D 1/02* (2020.01)
*G08G 1/01* (2006.01)
*G08G 1/04* (2006.01)
*G08G 1/052* (2006.01)
*G08G 1/00* (2006.01)

(52) U.S. Cl.
CPC ......... *G05D 1/0287* (2013.01); *G05D 1/0276* (2013.01); *G08G 1/0112* (2013.01); *G08G 1/0125* (2013.01); *G08G 1/04* (2013.01); *G08G 1/052* (2013.01); *G08G 1/20* (2013.01)

(58) Field of Classification Search
CPC .. G05D 1/0287; G05D 1/0276; G08G 1/0112; G08G 1/0125; G08G 1/04; G08G 1/052; G08G 1/20
See application file for complete search history.

(56) References Cited

U.S. PATENT DOCUMENTS

2014/0180499 A1\* 6/2014 Cooper ................. B61L 27/70 701/19
2019/0286161 A1\* 9/2019 Katou ...................... G08G 1/20

FOREIGN PATENT DOCUMENTS

CN 100477686 C \* 4/2009

\* cited by examiner

*Primary Examiner* — Rodney A Butler
(74) *Attorney, Agent, or Firm* — Fletcher Yoder, P.C.

(57) ABSTRACT

A system may include a first vehicle and a first control system that may control one or more vehicle operations of the first vehicle. The first control system may perform operations including receiving a first vehicle operation signal from a second control system associated with a second vehicle, sending one or more requests to one or more computing systems for a confirmation of the first vehicle operation signal, and determining a set of vehicle instructions to control the one or more vehicle operations based on whether one or more responses from the one or more computing systems provide the confirmation. The first control system may then control the first vehicle based on the set of vehicle instructions.

20 Claims, 3 Drawing Sheets

FIG. 4

CONTROLLING VEHICLE SYSTEMS BASED ON VERIFIED SIGNALS

CROSS REFERENCE TO RELATED APPLICATION

This application claims priority to U.S. Provisional Application No. 63/002,720, filed Mar. 31, 2020, the entire contents of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to controlling a vehicle system used to operate a vehicle based on signals received from other vehicles. More specifically, the present disclosure relates to controlling an operation of the vehicle system while accounting for potential false or fake signals sent to the vehicle system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a first vehicle and a first control system that may control one or more vehicle operations of the first vehicle. The first control system may perform operations including receiving a vehicle operation signal from a second control system associated with a second vehicle, sending one or more requests to one or more computing systems for a confirmation of the vehicle operation signal, and determining a set of vehicle instructions to control the one or more vehicle operations based on whether one or more responses from the one or more computing systems provide the confirmation. The first control system may then control the first vehicle based on the set of vehicle instructions.

In another embodiment, a method may include receiving, via at least one processor, a vehicle operation signal indicative of an operation associated with a first vehicle and sending, via the at least one processor, one or more requests to one or more computing systems for a confirmation of the vehicle operation signal. The method may then involve determining, via the at least one processor, a set of vehicle operations to implement to control one or more vehicle operations of a second vehicle based on whether one or more responses to the one or more requests are indicative of the confirmation being received. The method may also involve controlling, via the at least one processor, the first vehicle based on the set of vehicle instructions.

In yet another embodiment, a non-transitory computer-readable medium may include computer-executable instructions that, when executed, may cause at least one processor to perform operations that may include receiving a vehicle operation signal indicative of an operation associated with a first vehicle. The operations may also include sending one or more requests to one or more computing systems for a confirmation of the vehicle operation signal and receiving one or more responses from the one or more computing systems, such that the one or more responses may include data associated with an area in which the first vehicle is expected. The operations also include confirming that the vehicle operation signal is valid based on the one or more responses and determining a first set of vehicle operations to implement to control one or more vehicle operations of an additional vehicle in response to confirming that the vehicle operation signal is valid based on the one or more responses. The operations may then include controlling the first vehicle based on the set of vehicle instructions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "including" and "having" are used in an open-ended fashion, and thus should be interpreted to mean "including, but not limited to . . . ." Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

As autonomous vehicles become more prevalent on roads in the future, the vehicle systems used to control these vehicles may become targets that malicious individuals may attempt to hack to cause harm or be a nuisance. For example, vehicle systems that control autonomous or semi-autonomous vehicles may communicate between each other to coordinate each of its respective operations. Although the transmissions between these vehicle systems may be secured by encryption techniques and the like, hackers or other fraudsters may send fake or fraudulent signals to vehicle systems to create confusion between the vehicle systems. The resulting confusion between vehicle systems may cause a vehicle to get into accidents, vehicles to be controlled by external entities, or the like.

With the foregoing in mind, in some embodiments, a vehicle system may verify whether commands received from other vehicle systems are valid based on data received from other systems that may be available in the area. For example, a number of autonomous vehicles may receive an indication of a first vehicle's intent to stop. After receiving this indication, the vehicle system of a respective vehicle may query or confirm that the other vehicle systems received the same indication regarding the same vehicle. That is, if more than a threshold number of vehicle systems can verify that they received the same indication that the first vehicle is stopping, the respective vehicle systems may confirm that the first vehicle is stopping. The respective vehicle systems may then coordinate the operations of their respective vehicles while anticipating the first vehicle's action. In addition to receiving confirmation data from other vehicle systems, other devices, such as traffic devices, may be used to verify whether the indication that the one vehicle is stopping is accurate. In other embodiments, the vehicle system may confirm that the other vehicles are performing the expected operations (e.g., stopping) using cameras, speed detectors, detection of brake lights, changing location coordinates (e.g. GPS or cellular signal), and the like to verify that the other vehicle is indeed stopping. Additional details with regard to verifying that data regarding a vehicle's operation is genuine, along with other technologies for confirming traffic-related data, will be discussed in detail below with reference to FIGS. 1-4.

Figure 1:
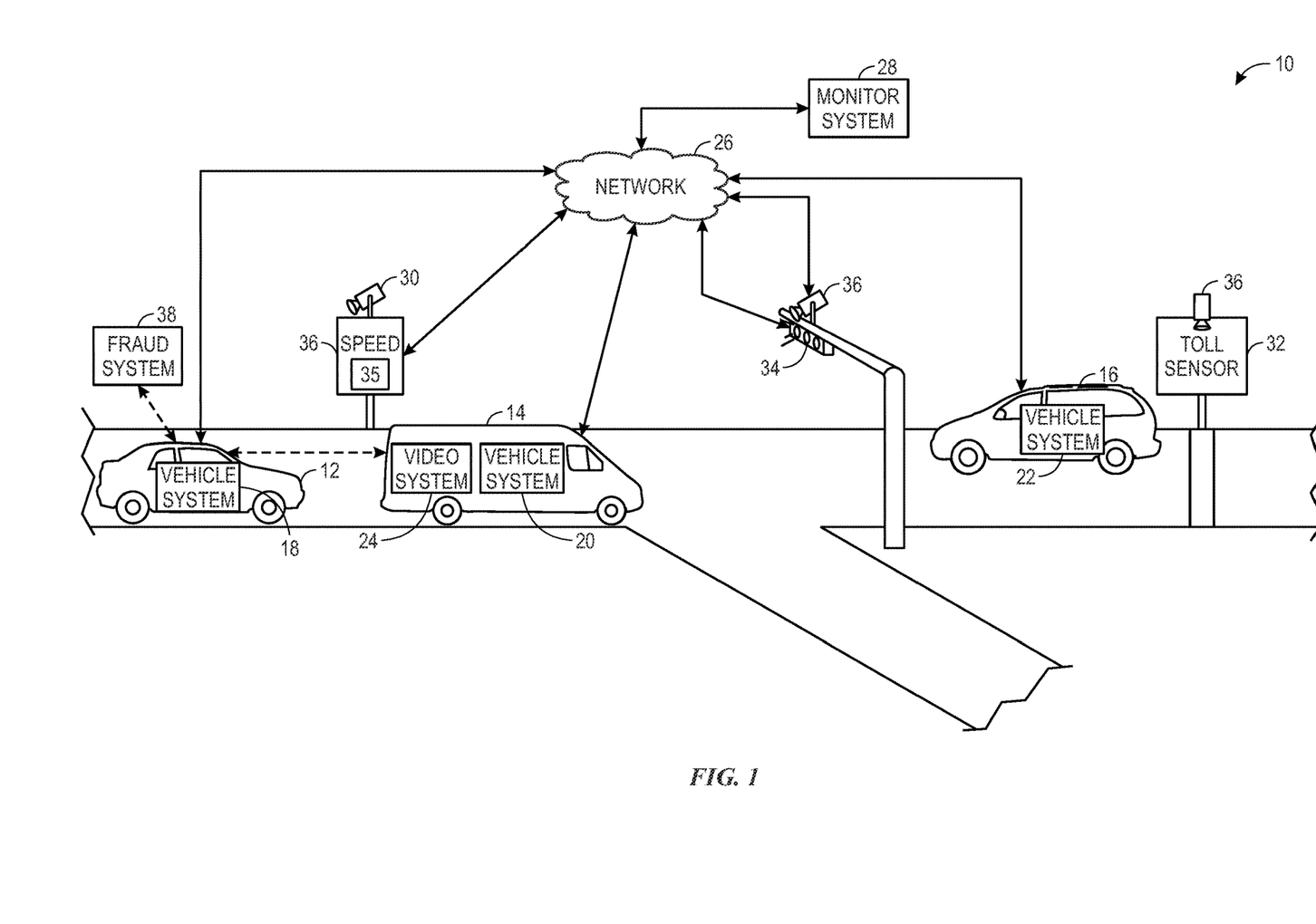
FIG. 1 illustrates a diagram of a system for receiving data from various sources including vehicle systems, in accordance with embodiments described herein.

By way of introduction, FIG. 1 illustrates a diagram of a system 10 of different vehicle systems and other devices may communicate with each other to verify received or detected vehicle operation signals. Referring to FIG. 1, the system 10 may include a number of vehicles 12, 14, and 16 that may be controlled by a number of vehicle systems 18, 20, and 22, respectively. In certain embodiments, the vehicle systems 18, 20, and 22 may be any suitable control or computing device that receives sensor data, user input data, and the like to determine how operations (e.g., acceleration, braking, driving properties) should be controlled. That is, the vehicle systems 18, 20, and 22 may be autonomous or semi-autonomous vehicles that control all or some driving operations of the vehicles 12, 14, and 16 or switches between autonomous driving and providing a user the ability to drive the respective vehicle.

By way of operation, the vehicle system 18, for example, may control operations of the vehicle 12 based on sensor data (e.g., video system 24, proximity sensors, image sensors) and signals received from other vehicle systems 20 or 22. For example, the vehicle system 18 may receive a vehicle operation signal from the vehicle system 20 indicating that the vehicle 14 will decrease its speed or stop within a certain distance. In response to receiving this information, the vehicle system 18 may control the vehicle 12 to reduce its speed to ensure that a threshold distance between the vehicle 12 and the vehicle 14 is maintained. In this way, the vehicle system 18 may coordinate the manner in which it controls the vehicle 12 based on the operations of other vehicles.

In addition to receiving data from other vehicles systems 14 and 16, the vehicle system 18 may receive data from other devices via a network 26 or directly from other devices. The network 26 may be any suitable wired or wireless (e.g., radio or light based) network that may facilitate communication of data between devices. In some embodiments, the network 26 may be a Wi-Fi network, a light detection and ranging (LIDAR) network, a LIDAR device, a 4G network, a 4G LTE network, a 5G network, a Bluetooth network, a Near Field Communication (NFC) network, or any suitable network for communicating information between devices.

Referring back to the vehicles 12, 14, and 16, the respective vehicle systems 18, 20, and 22 may communicatively couple to the network 26 to distribute data (e.g., vehicle operation signals) to other vehicle systems, a monitor system 28, or the like. The monitor system 28 may be any suitable computing device, service device, cloud-computing device, or the like that may collect data from a variety of sources and assist vehicle systems 18, 20, and 22 in determining how to control or adjust operations of the respective vehicles 12, 14, and 16.

Indeed, the monitor system 28 may receive traffic data from a speed detector 30, a toll sensor 32, a traffic light 34, cameras 36, and the like. The speed detector 30 may detect a speed of a vehicle using radar, image data, or any suitable speed detecting technology. The speed detector 30 may display the detected speed on an integral display and may transmit data related to the detected speed to the monitor system 28 or any other suitable device via the network 26, via a direct communication link, a broadcast signal, or the like. The data may include the detected speed, a time stamp associated with the detected speed, and the like. In this way, the traffic data and other data sources described herein may be used to determine the presence and operations of other vehicles that may not be equipped with a vehicle system or other computing system.

The toll sensor 32 may detect the presence of a tag (e.g., radio frequency identification tag) or an identifier (e.g. license plate data) used to access a toll road. The tag may be associated with a driver, a passenger, a physical item, a vehicle, or both. The toll sensor 32 may acquire data regarding the owner of a respective tag and may transmit data related to the detected tag to the monitor system 28 or any other suitable device via the network 26, via a direct communication link, or the like. The data may include a time stamp, speed, direction, weather conditions, traffic volume, and other properties associated with the detected tag, a vehicle owner associated with the tag, a vehicle make/model/year associated with the tag, and the like.

The traffic light 34 may be any suitable traffic device that illuminates different lights (e.g., light-emitting diode lights) to convey traffic commands (e.g., go, stop, slow). In addition to illuminating different lights, the traffic light 34 may send data (e.g., time to next green/red/yellow light, duration of next green/red/yellow, switching to blinking red/yellow in a certain amount of time, switching to red, green or yellow in a certain amount of time, mean/median speed of cars thru intersection over a period of time) or a log that is indicative of the state of the traffic light 34 at various times to the monitor system 28 or any other suitable device via the network 26, via a direct communication link, or the like.

In certain embodiments, one or more of the traffic devices described above may be accompanied by a respective camera 36. The camera 36 may be any suitable image sensor, such as a still image sensor, a video image sensor, an infrared image sensor, a thermal image sensor, a light sensor, or the like. The camera 36 may send image data (e.g., emergency vehicle identified, oversized vehicle identified, school bus identified, stolen vehicle identified, unregistered vehicle identified, uninspected/expired-inspection vehicle identified, military vehicle identified, crowd on or near road identified, accident identified, bicycle(s) identified, etc.) collected at different times to the monitor system 28 or any other suitable device via the network 26, via a direct communication link, or the like. In some embodiments, the transmission of the image data may be coordinated with the transmission of the respective data from the respective traffic device. For example, the speed detector 30 may send speed data of the vehicle 14 and the camera 36 collocated with the speed detector 30 may send the image data that corresponds to the speed data to the monitor system 28, such that the monitor system 28 may use the image data to verify the speed data. To coordinate the transmission of data, each respective device may broadcast a signal indicating that it will transmit its collected data for a certain time period to the monitor system 28. After receiving the broadcast signal, other devices may also send its collected data for the same time period to the monitor system 28.

Additionally, the present embodiments described herein may account for other data sources, such as computing devices, wearable devices, and the like that may be associated with pedestrians or other individuals in the area. That is, the vehicle system 18 or other suitable computing device may receive data from devices disposed on individuals or pets in accordance with the embodiments described herein.

In addition to the devices described above, in some embodiments drones or unmanned aerial vehicles may be employed to collect traffic data, image data, and the like. The drones may be ground-based drones that traverse roads and different terrains to collect various types of data. In this way, the drones may be positioned in the area and provide data to the vehicle system 18 or other suitable device to perform the embodiments described herein.

Referring back to the vehicle 14, in addition to the vehicle system 20, the vehicle 14 may include a video system 24. The video system 24 may include an image sensor that faces the front, side, rear, road, sky, or a combination of angles around the vehicle 14. The video system 24 may send or receive image data, such as still image data, video image data, or the like. Like the camera 36 and the other devices described above, the video system 24 may be communicatively coupled to the monitor system 28 or any other suitable device via the network 26, via a direct communication link, or the like.

As discussed above, the vehicle system 18 may observe various properties (e.g., proximity of other vehicles, weather, surface conditions) related to controlling the driving operation of the vehicle 12. In addition to the observed properties, the vehicle system 18 may receive data from other vehicles, such as vehicle system 20, that indicates its future driving operations. The vehicle system 18 may account for the future driving operations received from the vehicle system 20 to control its operations. Although the data received from other vehicle systems may be encrypted, a risk still exists for certain systems to send fraudulent or fake signals that appear to indicate a vehicle's future driving operations. For example, a fraud system 38, which may be any suitable computing device, may send fraudulent signals to the vehicle system 18 to appear as though they represent a nearby vehicles expected behavior. In response to the received fraudulent signals, the vehicle system 18 may adjust the driving operations (e.g., speed, braking, turn) to accommodate the expected action for another vehicle. The adjusted driving operations may result in an accident or other undesired event (e.g., delay). To ensure that the received signals appearing to originate from other vehicle systems are authentic, the vehicle system 18 may request confirmation of the vehicle signals from other vehicle systems. That is, the other vehicle systems should receive the same signal from a vehicle system, but the fraud system 38 may not be able to access other vehicle systems. As such, other vehicle systems may indicate to the vehicle system 18 that they did not receive the same signal and the vehicle system 18 may have received a fraudulent signal. In addition, in some embodiments, the monitor system 28 may use data obtained from other sources (e.g., local, state, federal entity or quasi government entity, industry entity, corporate entity, NGO, etc.) to verify whether the fraudulent signal is authentic or should be trusted. Additional details regarding a method for confirming the authenticity of received signals from vehicle systems will be discussed below with reference to FIG. 3.

Figure 2:
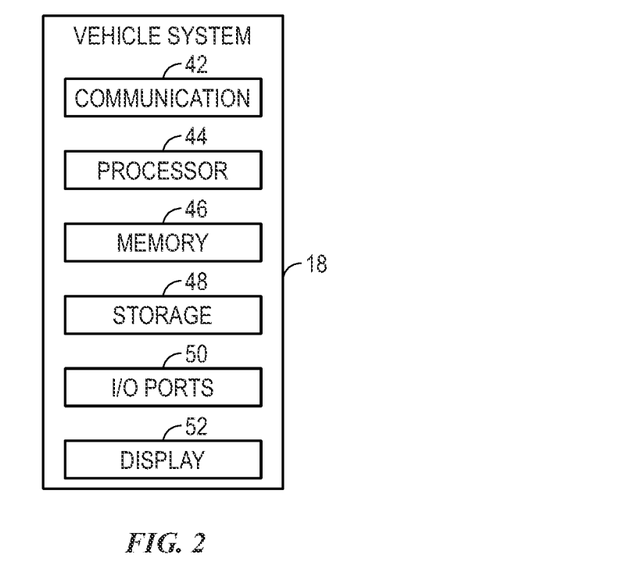
FIG. 2 illustrates a block diagram of a vehicle system that may be part of the system of FIG. 1, in accordance with embodiments described herein.

To perform some of the actions set forth above, the vehicle systems 18, 20, and 22 may include certain components to facilitate these actions. FIG. 2 is a block diagram of example components within the vehicle system 18. For example, the vehicle system 18 may include a communication component 42, a processor 44, a memory 46, a storage 48, input/output (I/O) ports 50, a display 52, and the like. The communication component 42 may be a wireless or wired communication component that may facilitate communication between the vehicle system 18, the traffic devices, the network 26, the monitor system 28, and the like. Additionally, the communication component 42 may facilitate data transfer to the vehicle system 18, such that the vehicle system 18 may receive data from the other components depicted in FIG. 1 and the like.

The processor 44 may be any type of computer processor or microprocessor capable of executing computer-executable code. The processor 44 may also include multiple processors that may perform the operations described below.

The memory 46 and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. The memory 46 and the storage 48 may also be used to store data described, various other software applications for analyzing the data, and the like. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may be interfaces that may couple to other peripheral components such as input devices (e.g., keyboard, mouse), sensors, input/output (I/O) modules, and the like. The display 52 may operate to depict visualizations associated with software or executable code being processed by the processor 54. In one embodiment, the display 52 may be a touch display capable of receiving inputs from a user of the vehicle system 18. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the vehicle system 18.

It should be noted that the components described above with regard to the vehicle system 18 are exemplary components and the vehicle system 18 may include additional or fewer components as shown. Additionally, it should be noted that the monitor system 28, the other vehicle systems 20 and 22, and the fraud system 38 may also include similar components as described as part of the vehicle system 18.

Figure 3:
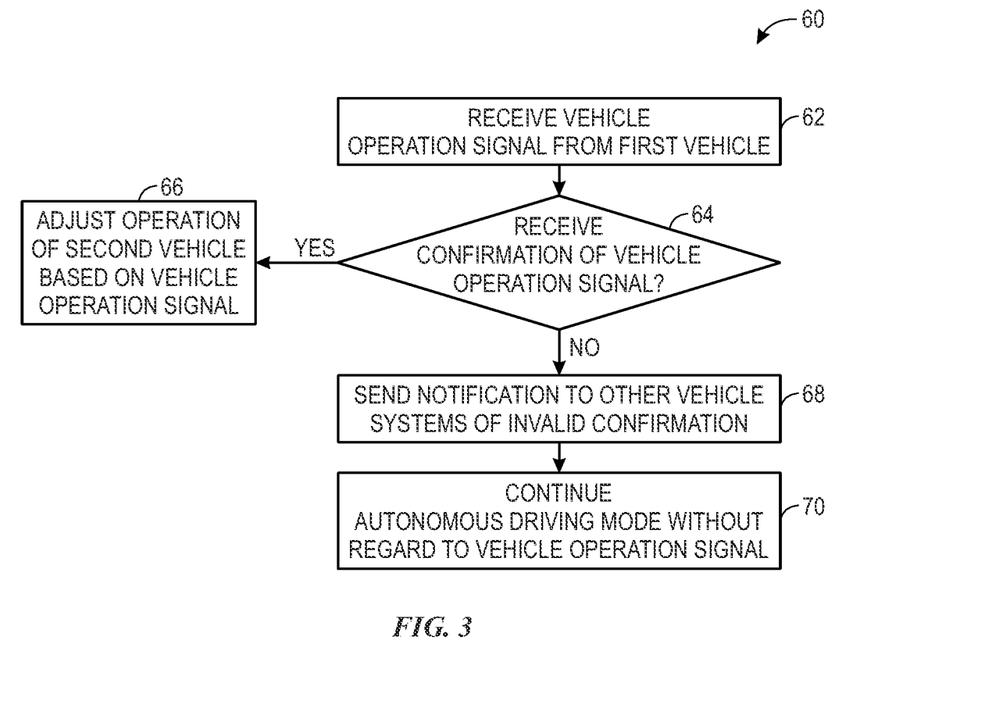
FIG. 3 illustrates a flow chart of a method for controlling a vehicle based on data acquired via the system of FIG. 1, in accordance with embodiments described herein.

With the foregoing in mind, FIG. 3 illustrates a flow chart of a method 60 employed by the vehicle system 18 for controlling operations of the vehicle 12 based on signals purported to be received from other vehicle systems. Although the following description of the method 60 is described in a particular order, it should be noted that the method 60 is not limited to the depicted order; and, instead, the method 60 may be performed in any suitable order. In addition, although the vehicle system 18 is described as performing the method 60, it should be understood that the method 60 may be performed by any suitable computing device including, for instance, the monitor system 28 and the like.

Before describing the method 60 of FIG. 3, in some embodiments, the vehicle system 18 may continuously scan for other traffic communications systems to identify potential information sources. After detecting other traffic communication systems, the vehicle system 18 evaluates sources as valid or invalid based on a common protocol, a software release level, a hardware release level, a security status, backward compatibility properties, a response time, ownership details, manufacturer data, an encryption method, a trust rating, a certification status, and the like. In addition, the vehicle system 18 may determine a value of the traffic communication system based on requirements for precision, accuracy, reliability, data latency, responsiveness, cost of data, registration status with the provider, and the like. The vehicle system 18 may use similar criteria listed in the prior sentence to continuously select and use a restricted number of sources (e.g., 10 best) to avoid communication overload or an Internet-like attack (e.g. DDoS).

Referring now to FIG. 3, at block 62, the vehicle system 18 may receive a vehicle operation signal from, for example, the vehicle system 20. The vehicle system 18 may receive the vehicle operation signal even when the signal is unsolicited or in response to a data request from vehicle system 18. The vehicle operation signal may be indicative of the future behavior or expected driving properties for the vehicle 14. That is, the vehicle operation signal may be broadcast by the vehicle system 20 to adjacent vehicle systems to convey information concerning the next driving operations (e.g., braking, accelerating, turning) of the vehicle 20. The vehicle operation signal may be used by the adjacent vehicle systems to, in turn, modify their respective driving operations and ensure that a threshold distance is maintained between vehicles, traffic is moving in a coordinated fashion (e.g., designed to minimize congestion, time to arrival, clear path for emergency vehicles, allow for pedestrians or bicycles, adjust for oversize vehicles, adjust for vehicles carrying certain types materials/chemicals, school bus safety, likelihood of accident), and the like.

As mentioned above, in some cases, the fraud system 38 or other external signal generating system may send fraudulent or erroneous signals/data to the vehicle system 18 in an attempt to deceive or mislead the vehicle system 18 into expecting a certain driving operation from another vehicle. In some embodiments, the fraud system 38 may trigger high volume transmissions to block effective vehicle communications (e.g., denial of service type of attack) by the vehicle system 18. In addition to the fraud system 38, other external signals that may be directed to different devices may mistakenly be interpreted as a vehicle operation signal.

To ensure that the received vehicle operation signal is authentic, at block 64, the vehicle system 18 may determine whether a confirmation of the vehicle operation signal has been received. That is, after receiving the vehicle operation signal, the vehicle system 18 may broadcast a request to other systems located within a proximity of the vehicle system 18 to send received vehicle operation signals to the vehicle system 18. In addition to the planned driving operations, the vehicle operation signal may include identifying information that describes the vehicle associated with the vehicle operation signal. The identifying information may include details regarding a make, a model, a year, a color, a license plate number, and other descriptive features related to the vehicle. In this way, the vehicle system 18 may be able to user other equipment (e.g., video system 24) to verify that the vehicle associated with the vehicle operation signal is indeed present in the vicinity of the vehicle system 18.

Referring back to block 64, if the vehicle system 18 receives the vehicle operation signal from a different vehicle control system or other suitable device (e.g., traffic devices, monitor system 28) and the received vehicle operation signal matches the vehicle operation system that the vehicle system 18 received at block 62, the vehicle system 18 may proceed to block 66. At block 66, the vehicle system 18 may respond to the information received at block 64. For example, the vehicle system 18 adjust the operation of the vehicle 12 to account for the vehicle operation signal. Alternatively, the vehicle system 18 may receive a confirmation of the received vehicle operation signal by way of alternate data sources, such as image data that confirms the vehicle identifying information provided in the vehicle operation signal. That is, data from the speed detector 30, the toll sensor 32, the traffic light 34, the cameras 36, or the video system 24 may be used to verify that the identification information of the vehicle operation signal matches the detected or observed vehicle, matches the vehicle operations represented in the vehicle operation signal, or the like. In this way, the vehicle system 18 may confirm that the vehicle associated with the vehicle operation signal is physically present and thus the vehicle operation signal is likely to have sent the vehicle operation signal.

Referring again to block 64, if the vehicle system 18 does not receive the confirmation of the vehicle operation signal, the vehicle system 18 may proceed to block 68. At block 68, the vehicle system 18 may send a notification to other vehicle systems of the invalid confirmation. That is, the vehicle system 18 may send information regarding the fraudulent vehicle operation signal, including a time and location in which the signal was received. In this way, other vehicle systems may be aware of the fraudulent vehicle operation signal and ignore the fraudulent vehicle operation signal. In addition, the vehicle system 18 may take other actions based on how the vehicle system 18 may be configured. For example, the vehicle system 18 may be configured such that it does not notify others of suspicion, it may notify law enforcement only, send disruptive transmissions to the fraudulent system, and the like.

After sending the notification to other vehicle systems, the vehicle system 18 may proceed to block 70 and continue operating in an autonomous driving mode while ignoring the fraudulent vehicle operation signal. In this way, the vehicle system 18 may proceed its normal operations by monitoring its surrounding environment to control the vehicle 12, while ignoring unconfirmed vehicle operation signals.

Referring yet again to block 64, in some embodiments, the vehicle system 18 may wait a threshold amount of time to receive responses to the request for confirmation of the received vehicle operation signals. If the vehicle system 18 does not receive the confirmation of the vehicle operation signal within the threshold amount of time, the vehicle system 18 may proceed to block 70. In this way, the vehicle system 18 may avoid waiting for delays in communication to proceed with vehicle operations.

By performing the embodiments described herein, the vehicle system 18 may control the risk associated with receiving fraudulent signals intended to disrupt the ability of the vehicle system 18 from effectively and safely operating the vehicle 12. These techniques may be used to control the operations of a vehicle and better protect the vehicle system 18 from potential fraudsters.

In addition to using surrounding traffic devices to confirm vehicle operation signals, in some embodiments, the monitor system 28 or other suitable computing device may collect data available from traffic devices in response to detecting that an accident occurred. That is, the monitor system 28 may coordinate a collection of data that may be relevant to the occurrence of an accident to use for verification purposes, improvement to autonomous vehicle driving models, insurance claim processing, reporting criminal activity, and the like. Indeed, with the proliferation of a variety of devices that monitor traffic and driving conditions on various roads, the ability of the monitor system 28 to efficiently collect data from devices within a proximity of the location of the accident increases.

By providing the ability to collect data in this manner, the monitor system 28 may reduce the likelihood of deepfake videos or images that may be used to defraud individuals or organizations into performing certain actions in light of an accident. That is, deepfake videos of accidents or video/image data that are altered to depict damage to property due to an accident or some other factor is more commonly being used to secure claim payment from insurance providers and perform other types of fraud. In addition, data regarding the occurrence of an accident may also be used to alter the operations of the vehicle control system 18. By verifying the occurrence of the accident, the vehicle control system 18 may control the vehicle 12 using an accurate representation of the surrounding environment.

Figure 4:
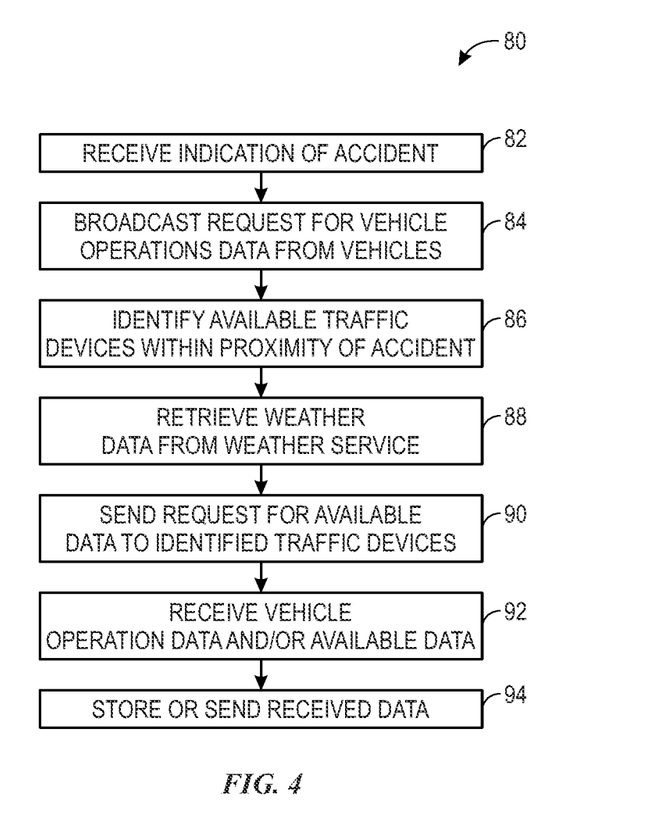
FIG. 4 illustrates a flow chart of a method for retrieving data available from traffic devices that are part of the system of FIG. 1, in accordance with embodiments described herein.

With the foregoing in mind, FIG. 4 illustrates a flow chart of a method 80 employed by the monitor system 28 for collecting and storing data related to the occurrence of an accident. Although the following description of the method 80 is described in a particular order, it should be noted that the method 80 is not limited to the depicted order; and, instead, the method 80 may be performed in any suitable order. In addition, although the monitor system 28 is described as performing the method 80, it should be understood that the method 80 may be performed by any suitable computing device including, for instance, the vehicle systems 18, 20, 22 and the like.

Referring now to FIG. 4, at block 82, the monitor system 28 may receive an indication of an accident, a prediction that an accident is likely to have occurred, or a prediction that an accident is likely about to occur based on predictive analytics and confidence levels. In some embodiments, the indication may be received by an individual that sends a notification to the monitor system 28 via a website, a mobile application, the network 26, or the like. In another embodiments, the vehicle system 18 may detect that an accident occurred using accelerometers or other sensors disposed on the vehicle 12. After detecting the accident, the vehicle system 18 may send the indication of the accident to the monitor system 28. In some embodiments, the indication may indicate the expected, predicted, or assessed magnitude or impact of the accident including the possibility of hazardous chemicals, a number of vehicles, a number of people, expected road damage, and the like.

The indication may include a time stamp and a location of the source of the indication. That is, if an individual sends the indication, the indication may include a time stamp and location data associated with the device sending the indication. In the same manner, the vehicle system 18 (or other suitable vehicle systems) may send time stamp data and location information regarding the time and place where the accident was detected.

After receiving the indication, at block 84, the monitor system 28 may broadcast a request for vehicle operation data from vehicles that may be located within a proximity or threshold distance of the location denoted in the indication. That is, if the accident occurred within a vicinity where other vehicle systems may be present, the data collected by those vehicle systems may be requested for review by the monitor system 28. The data acquired by the vehicle systems may be used to confirm whether traffic slowed down after the time of the accident, whether video data (e.g., from video system 24) is available to review the accident, or the like. The vehicle operation data may include data from the vehicle 12 that was involved in the respective accident. In this way, the monitor system 28 may collect the data relevant to the accident in an efficient manner. Moreover, the vehicle operation data may be stored in a particular format, such that other collected information may be stored or organized together to better enable cross validation methodologies.

In addition to broadcasting requests for vehicle operation data, the monitor system 28 may, at block 86, identify traffic devices that that are within a proximity of the location of the accident. That is, the monitor system 28 may determine whether the speed detector 30, the toll sensor 32, the traffic light 34, the cameras 36, or other data sources are within a proximity or threshold distance of the accident.

At block 88, the monitor system 28 may retrieve weather data from a weather service or some other suitable source. The weather service may provide localized weather information indicative of weather conditions, visibility data, moisture data, and other types of weather-related data that corresponds to the time stamp and location of the accident. For example, the weather data may indicate whether clouds were present, rain was occurring, or other relevant weather patterns were present.

At block 90, the monitor system 28 may send requests for data to the traffic devices identified at block 86. The requests for data may include requests for datasets that includes a time period before and after the occurrence of the accident. In some embodiments, the traffic devices may store acquired data in a cache or some limited storage component. As such, the monitor system 28 may send the request to received available data in an efficient manner after receiving the indication of the accident.

In some embodiments, the traffic devices may send acquired data to the monitor system 28 or to some other storage component via the network 26 at regular intervals. After receiving the request for available data, these traffic devices may send a response packet indicative of the other storage component or service. Alternatively, the traffic devices may forward the requests to the other storage component or service, such that the other storage component or service may retrieve the relevant data.

At block 92, the monitor system 28 may receive the vehicle operation data from the vehicle systems that received the broadcasted requests at block 84 and the identified traffic devices. The monitor system 28 may receive the relevant datasets from the various data sources and organize the received dataset according to a common data format. The common data format may include an archive file or array of entries in a database that is organized with respect to individual vehicle systems that transmitted vehicle operation data, individual traffic devices, types of traffic devices, and types of data (e.g., raw data, image data, video data).

At block 94, the collected and organized data may be stored in a storage component accessible to the monitor system 28. In some embodiments, the monitor system 28 may send the collected data to the vehicle system 18 involved in the accident. In addition to sending the collected data to the vehicle system 18, the monitor system 28 may send the collected data to a computing device associated with the individual that sent the indication of the accident at block 82.

In some embodiments, after collecting and storing the relevant datasets, the monitor system 28 may determine whether the accident occurred and identify how the accident may affect traffic. That is, the monitor system 28 may determine that traffic may be directed in a particular route to avoid the accident and reduce traffic congestion across the roads, or clear paths for emergency or other high priority vehicles. The data volume, data fields, distance, range or extent of data sharing and traffic control may vary based on many factors including: local/state/federal law, system limitations, the planned route, social conditions (e.g., calm, emergency situation, catastrophe, evacuation, etc.), limitations or requirements of the "traffic management grid", individual choice of the vehicle owner. As such, the monitor system 28 may send commands to traffic devices to control the flow of traffic in accordance with identified detours. For example, the traffic devices may include electronic signage that may display messages, such as detour information, delay information, and the like.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment. Although the present disclosure has been described with respect to specific details, it is not intended that such details should be regarded as limitations on the scope of the present disclosure, except to the extent that they are included in the accompanying claims.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more traffic monitoring devices configured to receive one or more vehicle operation signals corresponding to one or more vehicle operations of one or more vehicles driving in an area; and
a first vehicle control system comprising at least a first processor configured to control a first set of vehicle operations of a first vehicle, wherein the first vehicle control system is configured to perform operations comprising:
receiving a vehicle operation signal from a second vehicle control system associated with a second vehicle, wherein the second vehicle control system comprises at least a second processor, and wherein the vehicle operation signal corresponds to an operational property of the second vehicle;
sending one or more requests to the one or more traffic monitoring devices for a confirmation of the vehicle operation signal, wherein the one or more traffic monitoring devices are separate from the first vehicle control system and the second vehicle control system, and wherein the one or more traffic monitoring devices are configured to:
  determine that one of the one or more vehicle operation signals corresponds to the vehicle operation signal; and
  send a confirmation of receipt of the vehicle operation signal to the first vehicle control system in response to determining that the one of the one or more vehicle operation signals corresponds to the vehicle operation signal;
verifying that the vehicle operation signal is valid based on the confirmation;
determining a set of vehicle instructions to control the one or more vehicle operations based on the vehicle operation signal in response to verifying that the vehicle operation signal is valid; and
controlling the first vehicle based on the set of vehicle instructions.

2. The system of claim 1, wherein the first vehicle control system is configured to:
determine that the confirmation is not received; and
determine the set of vehicle instructions without regard to the vehicle operation signal.

3. The system of claim 1, wherein the one or more traffic monitoring devices comprise one or more other vehicle systems configured to control one or more other vehicle operations.

4. The system of claim 1, wherein the vehicle operation signal comprises identification information that corresponds to the second vehicle.

5. The system of claim 1, wherein the first vehicle control system is configured to perform the operations comprising receiving one or more responses from a third vehicle control system that received the vehicle operation signal, wherein the third vehicle control system is located within a threshold distance of the first vehicle control system and comprises at least a third processor.

6. The system of claim 1, wherein the first vehicle control system is configured to perform the operations comprising sending one or more notifications to an additional vehicle control system associated with an additional vehicle in response to not receiving the confirmation within a threshold time, wherein the one or more notifications are indicative of the vehicle operation signal being fraudulent.

7. The system of claim 1, wherein the first vehicle control system is configured to perform the operations comprising accounting for the vehicle operation signal when determining the set of vehicle instructions in response to the confirmation being received.

8. A method, comprising:
receiving, via at least one processor, a vehicle operation signal indicative of an operation associated with a first vehicle;
sending, via the at least one processor, one or more requests to one or more traffic monitoring devices for a confirmation of the vehicle operation signal, wherein the one or more traffic monitoring devices are separate from the first vehicle and are configured to:
  receive a plurality of vehicle operation signals;
  determine that one of the vehicle operation signals corresponds to the vehicle operation signal; and
  send a confirmation of receipt of the vehicle operation signal to the at least one processor in response to determining that the one of the plurality of vehicle operation signals corresponds to the vehicle operation signal;
verifying, via the at least one processor, that the vehicle operation signal is valid based on the confirmation;
determining, via the at least one processor, a set of vehicle instructions to control one or more vehicle operations of a second vehicle based on the vehicle operation signal; and
controlling, via the at least one processor, the first vehicle based on the set of vehicle instructions.

9. The method of claim 8, comprising sending one or more notifications to an additional vehicle control system associated with an additional vehicle in response to not receiving the confirmation within a timeframe, wherein the one or more notifications are indicative of the vehicle operation signal being fraudulent.

10. The method of claim 9, wherein the one or more notifications are indicative of a time, a location, or both that corresponds to a receipt of the vehicle operation signal.

11. The method of claim 8, wherein the one or more traffic monitoring devices correspond to a traffic device, a camera device, or both.

12. The method of claim 11, wherein the one or more traffic monitoring devices comprise a speed detector, a toll sensor, or a traffic light.

13. The method of claim 11, wherein the one or more traffic monitoring devices comprise one or more cameras, a video system, or both.

14. The method of claim 8, wherein verifying that the vehicle operation signal is valid comprises:
receiving image data comprising identification information associated with the first vehicle from the one or more traffic monitoring devices, wherein the image data is representative of the first vehicle;
determining an identification information associated with the first vehicle based on the vehicle operation signal; and
determining that the vehicle operation signal is valid in response to the identification information being present in the image data.

15. A non-transitory computer-readable medium comprising computer-executable instructions that, when executed, are configured to cause at least one processor to perform operations comprising:
receiving a vehicle operation signal indicative of an operation associated with a first vehicle;
sending one or more requests to one or more traffic monitoring devices for a confirmation of the vehicle operation signal, wherein the traffic monitoring one or more devices are separate from the first vehicle and are configured to:
  receive a plurality of vehicle operation signals;
  determine that one of the vehicle operation signals corresponds to the vehicle operation signal; and
  send a confirmation of receipt of the vehicle operation signal to the at least one processor in response to determining that the one of the plurality of vehicle operation signals corresponds to the vehicle operation signal;
verifying that the vehicle operation signal is valid based on the confirmation;
determining a set of vehicle instructions to control one or more vehicle operations of a second vehicle based on the vehicle operation signal; and
controlling the first vehicle based on the set of vehicle instructions.

16. The non-transitory computer-readable medium of claim 15, wherein the computer-executable instructions, when executed, are configured to cause the at least one processor to perform the operations comprising:
   determining an additional set of vehicle instructions to implement to control the set of vehicle operations in response to not receiving the confirmation; and
   controlling the first vehicle based on the additional set of vehicle instructions.

17. The non-transitory computer-readable medium of claim 16, wherein the additional set of vehicle instructions is determined without regard to the vehicle operation signal in response to not receiving the confirmation.

18. The non-transitory computer-readable medium of claim 15, wherein the one or more traffic monitoring devices are configured to acquired traffic data associated with a plurality of vehicles in an area.

19. The non-transitory computer-readable medium of claim 15, wherein the one or more traffic monitoring devices comprise one or more image sensors.

20. The non-transitory computer-readable medium of claim 15, wherein the one or more traffic monitoring devices are configured to control one or more additional vehicle operations of one or more additional vehicles.

* * * * *